3,701,824
METHOD OF REMOVING ODORIFEROUS SULPHUR COMPOUNDS FROM VAPOURS OR GAS STREAMS
Steven Prahacs, Beaconsfield, Quebec, and Satya Pal Bhatta, Pointe Claire, Quebec, Canada, assignors to Pulp and Paper Research Institute of Canada, Quebec, Canada
Filed Oct. 2, 1970, Ser. No. 77,412
Claims priority, application Canada, Mar. 25, 1970, 78,366
Int. Cl. B01d 53/34
U.S. Cl. 423—225
26 Claims

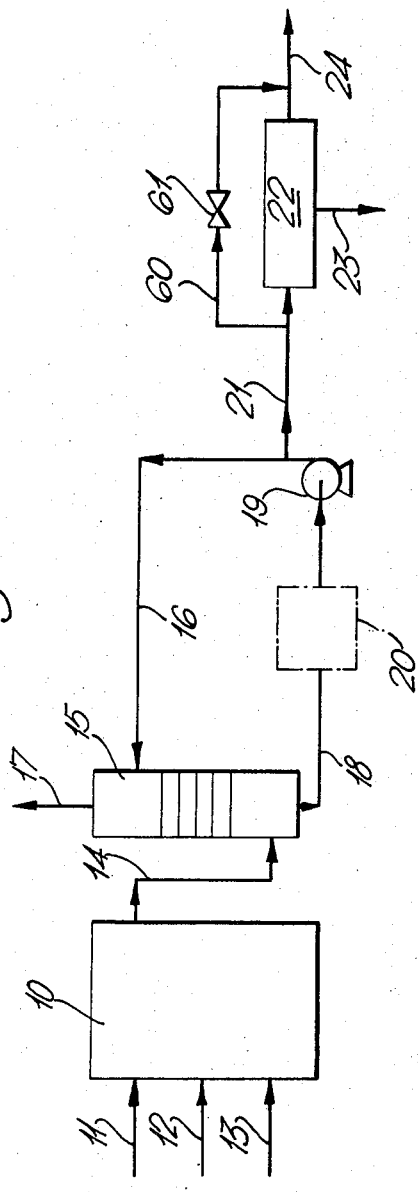

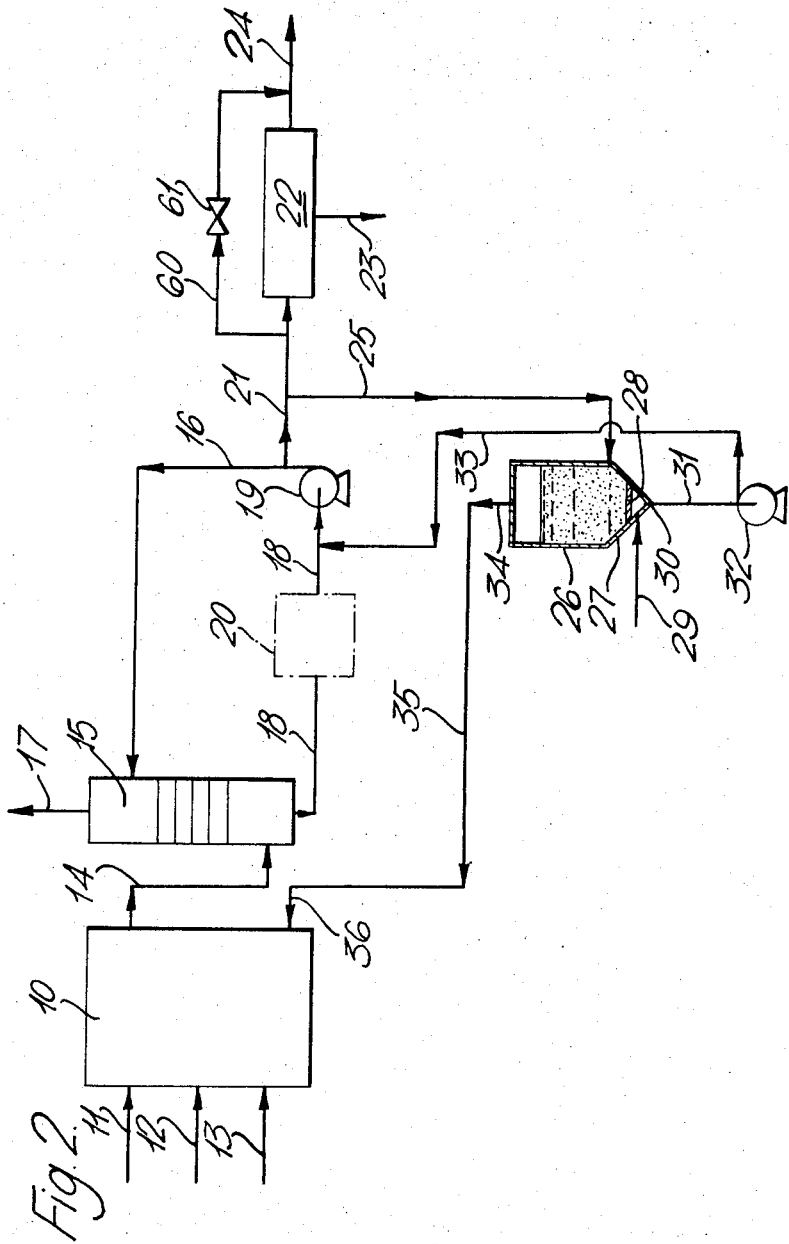

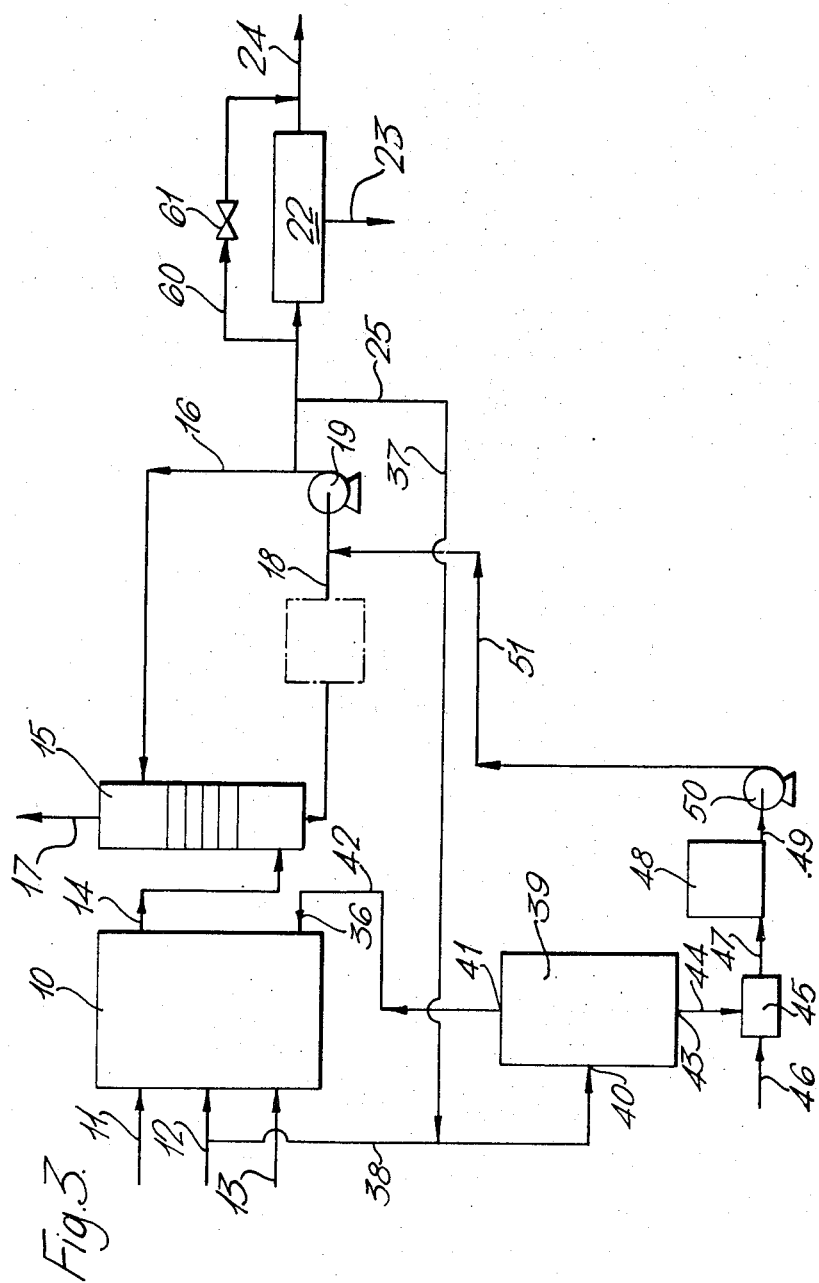

ABSTRACT OF THE DISCLOSURE

Objectionably odoriferous sulphurous gases, e.g. $H_2S$ and $CH_3SH$, are removed from a gaseous stream by intimately contacting the stream with an aqueous alkaline suspension of activated carbon having a pH of at least about 8 in the presence of at least about 12% by volume of $CO_2$ and not more than about 6% by volume of $O_2$, the activated carbon thereby promoting the oxidation of sulphide ions and $CH_3SH$.

BACKGROUND OF THE INVENTION

Field of the invention

This invention relates to the abatement of air pollution resulting from any industrial process, where at least one of the objectionable components in a gas stream which is emitted to the atmosphere is hydrogen sulphide or organic sulphur compounds, for example, methyl mercaptan, dimethyl sulphide, carbon disulphide, etc. More particularly, the invention relates to the reduction in the emission of the above-mentioned objectionably odoriferous compounds originating from kraft pulp mills, specifically from recovery furnaces, lime kilns, smelt tanks, blow tanks, digester relief systems, pulp washers, and from black liquor evaporators in kraft mills.

Description of the prior art

Air pollution caused by objectionably odoriferous sulphur compounds, for example, hydrogen sulphide, mercaptans and mercaptan ethers, for example, dimethyl sulphide are particularly objectionable to communities located in the vicinity of industrial establishments such as, for example, kraft pulp mills. This is because even extremely small quantities, typically 5 to 50 parts per billion of these compounds present in the atmosphere can be detected by the human nose, and higher levels can cause great discomfort to those who are exposed to these chemicals, since they have most unpleasant odours. Because of the low odour thresholds which are characteristic of these sulphur compounds, a treatment process for their removal, when this is called for, has to be highly efficient.

AIMS OF THE INVENTION

An object of an aspect of the present invention is the provision of a treatment process for the high efficiency removal of objectionably odoriferous compounds from a gaseous stream in a single absorption step, even if a variety of these sulphur compounds is present in the gas stream that is to be discharged into the atmosphere.

An object of another aspect of this invention is the provision of such a process which is exceptionally efficient in removing any combination of the above-mentioned objectionably odoriferous compounds by the use of a treating agent which may be obtained as a by-product of the main process at a very economical cost if it is produced and used at the same kraft pulp mill.

SUMMARY OF THE INVENTION

Broad statements of the invention

By one broad aspect of the present invention, a process is provided for the removal of odoriferous sulphur containing compounds from a gas stream which comprises intimately contacting the gas stream with an aqueous alkaline suspension of activated carbon having a pH of at least about 8, in the presence of at least about 12% by volume of $CO_2$ and not more than about 6% by volume of oxygen based on the gaseous stream on a dry basis, the activated carbon thereby promoting the oxidation of sulphide ions and $CH_3SH$. Such process is carried out in any apparatus which is suitable for efficient gas-liquid contacting.

By one embodiment of this aspect of the invention, the slurry comprises powdered or relatively fine granular carbon and any suitable alkaline agent, e.g. sodium carbonate, potassium carbonate, sodium hydroxide, potassium hydroxide, calcium hydroxide, magnesium hydroxide or mixtures thereof.

By another embodiment of this aspect of this invention, at least a portion of the alkalinity and/or the activated carbon is supplied by recovered suspended particulate matter which has been scrubbed from the gas stream being treated.

By still another embodiment of this aspect of this invention, the suspension of activated carbon comprises a bark char fly ash material collected in a solid-gas separator device in the flue gas outlet from a bark-burning power plant.

By one embodiment of this invention, the steps are provided of passing the gas stream upwardly in a scrubbing zone through a moving aqueous alkaline slurry or suspension of activated carbon. In this embodiment, the slurry is continuously removed from the scrubbing zone and is continuously recycled to the scrubbing zone. The contact between the upwardly moving gas stream and the moving aqueous alkaline slurry or suspension of activated carbon may be either countercurrent (e.g., in a cascade-type scrubber or a turbulent contact absorber) or cocurrent (e.g., in a Venturi scrubber).

By another embodiment of this invention, a minor stream of the slurry which is continuously removed is withdrawn from the recycle stream, and is filtered to remove solids from liquids. Fresh slurry is then added to the recycle stream. In this embodiment, the following steps are provided, namely combusting the separated solids in a recovery furnace, and introducing the liquid into a spent liquor recovery cycle.

By still another embodiment of this invention, a minor stream of the removed slurry is withdrawn from the recycle stream, and passed into a sparging zone where an oxidizing gas is passed therethrough. By such steps, the concentration of the sulphide sulphur therein is reduced and a significant fraction of the organic sulphur components therein are stripped out and/or transformed. Finally, a partially regenerated slurry of activated carbon is returned to the recycle stream.

By yet another embodiment of this invention, a minor stream of the removed slurry is withdrawn from the recycle stream, and is passed to an activated carbon production zone along with spent pulping liquors containing dissolved organic matter of lignocellulosic origin as one group of components and one or more non-volatile basic pulping agents as another group of components. These materials are subjected to a process of controlled partial high temperature pyrolytic or oxidation treatment. This treatment provides a solid product which is an intimate mixture of an adsorbent organic activated carbon residue and an inorganic product that exhibits alkaline reaction when dissolved in water. The fresh slurry of aqueous alkaline activated carbon so prepared is then returned to the recycle stream.

By another embodiment of this aspect of the invention, the slurry is prepared from spent pulping liquors containing dissolved organic matter of lignocellulosic origin as one group of components and one or more non-volatile basic pulping agents as another group of components, by a process of controlled partial high temperature pyrolytic or oxidation treatment. This treatment provides a solid product which is an intimate mixture of an adsorbent organic activated carbon residue and an inorganic product that exhibits alkaline reaction when dissolved in water.

DESCRIPTION OF PREFERRED EMBODIMENTS

General description

Thus, in a broad sense, one aspect of this invention resides in the use of alkaline slurries of activated carbon for the removal of hydrogen sulphide, mercaptans, such as, for example, methyl mercaptan, thio-ethers, such as, for example, dimethyl sulphide as well as other objectionably odoriferous organic sulphur compounds from any gaseous emission. In one embodiment, the invention is applicable to the treatment of such gases originating from kraft, polysulphide or other alkaline pulping processes using sulphide sulphur as one of the pulping agents.

The present invention, as disclosed herein, is directed to the use of any suitable alkaline suspension of activated carbon for removing $H_2S$ and organic sulphur compounds from gaseous emissions containing $H_2S$ or organic sulphur components regardless of the origin of the gases from any industrial activity. Thus, the invention resides in the use of aqueous alkaline suspensions of activated carbons for the removal of $H_2S$ or organic sulphur compounds from many kinds of gaseous emissions.

The aqueous alkaline slurries or suspensions of activated carbons to be used in the process according to broad aspects of the present invention can be prepared in any suitable way, with various types of powdered or relatively fine granular carbons and any suitable alkaline agent, such as, for example, sodium carbonate, potassium carbonate, sodium hydroxide, potassium hydroxide, calcium hydroxide or magnesium hydroxide, or suitable mixtures or combinations of these alkaline agents used as the components of the absorbent slurry.

In another aspect of this invention, which is of special technical and economic advantage, in some cases, part or all of the required alkaline agent and/or the active char may be present as suspended particulate matter in the odoriferous gases to be treated for the abatement of their odour. In such cases, the medium used for scrubbing these gases for any purpose would capture some fraction, and possibly nearly all the particulate matter. Thus, the required alkalinity and/or the large surface area for adsorption and/or catalytic oxidation could be supplied at least partially, and in some cases, completely, by the alkaline and/or active carbon matter scrubbed from the gases under treatment. Such might be the case in some recovery furnaces in pulp mills, where the fly-ash contains some $Na_2CO_3$ and/or $MgO$ and/or $CaO$ and/or some char of appreciable surface area (activity).

The relative proportions of the activated carbon and the alkaline agent in the slurry depend upon a number of interdependent parameters, the chief being the nature of and amount of the gases being treated. If the gas composition includes only certain relatively easily oxidizable odoriferous sulphur compounds, e.g. $H_2S$ and methyl mercaptans, in amounts of the order of 100–2000 p.p.m., it is possible, under certain conditions, to use very low concentrations of carbon, of the order of 0.02–0.1% by weight. In such case, however, it is important that oxygen and/or sulphur dioxide be present, or are introduced, in concentrations which are sufficient for the oxidation of the above-mentioned sulphur compounds. The oxidation products would include non-odoriferous and/or non-volatile elementary sulphur or other sulphur compounds, such as, for example, sodium thiosulphate, or, in the case of mercaptans, would include low volatility dimethyl disulphide and its higher oxidation products. The above-described conditions are normally satisfied in a typical recovery furnace exit gas in a pulp mill.

If the gas contains substantial quantities (10 to 100 p.p.m. or more) of dimethyl sulphide and/or dimethyl disulphide, then a higher range of carbon should be used, e.g. of the order of 0.1% up to about 10% by weight.

The amount of alkali used is dependent on that necessary to provide a pH over 8 and preferably over 8.5. This may be achieved with amounts of sodium carbonate of 0.5–20% by weight, even if most of this sodium carbonate is converted into sodium bicarbonate in the presence of carbon dioxide in the gases being treated.

The preferred process of preparing such slurry for use in pulp mills comprises, as a first step, the high temperature pyrolytic or partial oxidation treatment of spent pulping liquors containing dissolved organic matter or lignocellulosic origin as one group of components and one or more non-volatile pulping bases, such as, for example, sodium, potassium, calcium or magnesium compounds as the other group of components. The above-described suitable high temperature treatment, when applied as one step in the purpose of an aspect of the present invention, is controlled as to the degree of pyrolysis or partial oxidation to assure that it will result in the production, as one of the products of the treatment, of a solid product which is an intimate mixture of an adsorbent organic residue, namely, activated carbon, and an inorganic product that exhibits alkaline reaction when dissolved in water.

There are various processes now in commercial use that produce the required type of solid product from sodium-base spent pulp liquors. Typically, this solid product is subsequently leached, filtered, washed and dried, or, in many cases, subjected to further high temperature treatment to produce an activated carbon of the desired characteristics. Some activated carbon is produced in the typical kraft recovery furnaces, and such activated carbon may be recovered from the so-called green liquor "dregs" and used in the procedure according to an aspect of the present invention.

In the preferred embodiment of the present invention, the primary solid product of the type described above is used in an aqueous slurry, without separation, drying or any further treatment, for absorbing objectionably odoriferous sulphur compounds originating in a pulp mill.

In any embodiment, bark char or bark fly-ash, which can be considered as activated carbons of relatively poor quality, can be effective when a sufficiently large quantity is applied in the form of an alkaline suspension or slurry. A bark char fly-ash material (a moderately active charcoal) may be obtained as part of the fly-ash collected in a multicyclone or other solid-gas separator device in the flue gas outlet from a bark burning power boiler.

The actual intimate contacting of these sulphur compounds can be carried out in any suitable manner, using contacting equipment which is suitable for efficient gas-liquid contacting. Examples of such equipment include cyclone scrubbers, impingement scrubbers, dynamic scrubbers, fog scrubbers, pebble bed scrubbers, multidynamic scrubbers, submerged nozzle scrubbers, jet scrubbers, Venturi scrubbers, turbulent contact absorbers, cascade-type scrubbers, etc.

Partial regeneration of the absorbent suspension may be carried out, according to the process of another aspect of this invention, in a buffer tank or other suitable equipment, by purging air into the slurry. The resulting oxidation reactions greatly reduce the concentration of the sulphide sulphur in the aqueous alkaline solution, and strip out and/or transform a significant fraction of the organic sulphur components. Alternatively, nearly complete regeneration of the suspensions may be carried out by essentially repeating the high temperature pyrolytic or partial oxidation treatment used in the production of the alkaline slurry of activated carbon, but this time using the spent alkaline slurry as the feed material. In the latter case, the bulk of the sulphur compounds originally absorbed and adsorbed would be released, mostly as $H_2S$, which may be fed to the recovery furnace, thus assuring retention of the sulphur in the pulping cycle. Alternatively, instead of high temperature regeneration, the spent inorganic solution, or part of it, may be separated from the spent activated carbon, e.g. by filtration, and the carbon burnt in the recovery furnace or in the power boiler, while the solution of inorganic salts may subsequently be introduced into the spent liquor recovery cycle at a suitable point, for example, at the recovery furnace or at the causticizer. Typically, a small fraction of the spent suspension would be treated in this fashion, with an equivalent stream of fresh suspension used as a make-up.

DESCRIPTION OF THE DRAWINGS

Brief description of the drawings

In the accompanying drawings:

FIG. 1 is a schematic drawing of one procedure for carrying out the process of this invention for removing odoriferous gases from the effluent from a kraft recovery furnace;

FIG. 2 is a schematic drawing similar to FIG. 1 and also showing, in idealized form, one procedure for regeneration of the absorbent material; and FIG. 3 is a schematic drawing similar to FIG. 1 and also showing in idealized form, a second procedure for regeneration of the absorbent material.

Description of FIG. 1

FIG. 1 illustrates what is the preferred embodiment of the process of this invention when very low concentrations (i.e. 0.02 to 0.1% by weight of slurry) of carbon are used in the absorption step. The kraft recovery furnace 10 of a conventional kraft pulp mill is fed with boiler feed water, through boiler feed water inlet line 11, concentrated black liquor, through black liquor inlet line 12, and air, through air inlet line 13. The concentrated black liquor is a spent pulping liquor, particularly one derived from the sodium-base pulping of cellulosic plant material, e.g. wood. The gaseous effluent from the kraft recovery furnace 10 is fed, by infeed line 14 to the bottom of a gas scrubber 15 where it is contacted countercurrently with an aqueous alkaline slurry or suspension of activated carbon, admitted via absorbent inlet line 16. The gaseous effluent from the kraft recovery furnace 10 normally contains objectionably odoriferous sulphur-containing gases including one or more of hydrogen sulphide, mercaptans, thio-ethers, etc. The carry-over may be led from the kraft recovery furnace 10 to the absorbent inlet line 16 carrying the aqueous alkaline slurry, to provide part or all of the required alkalinity and/or activated carbon. The gas scrubber 15 may be any suitable and conventional equipment, such as, for example, Venturi scrubbers, turbulent contact absorbers, cascade-type scrubbers, etc. Substantially odour-free gas is vented from the gas scrubber 15 via gas outlet line 17, and may be passed to a conventional stack (not shown).

The aqueous alkaline slurry or suspension of activated carbon is withdrawn from the bottom of the gas scrubber 15 through slurry outlet line 18, and this may be recycled, by means of pump 19 to inlet line 16 back to gas scrubber 15. Alternatively, the withdrawn slurry may be led to an agitated hold-tank 20 subsequent to being withdrawn and prior to being pumped via pump 19 and through inlet line 16 back to the gas scrubber 15.

Furthermore, a minor portion of the stream pumped by pump 19 through line 16 to the gas scrubber 15 may be withdrawn via first branch line 21 and can be passed through a filter 22. On the other hand, if the carbon concentration in the withdrawn slurry is very low, the filter 22 may be by-passed by by-pass line 60 provided with a valve 61 therein. When desired, by means of the filter 22, the solids can be separated from the liquid and any separated such solids may then be removed as spent carbon through solids removal line 23. The spent carbon may be fed to the recovery furnace or to a conventional power boiler (not shown). The super-natant liquid that can be withdrawn through liquid removal line 24 would usually comprise a solution of inorganic materials, e.g. $Na_2CO_3$, $NaHCO_3$, $Na_2S_2O_3$, $Na_2SO_4$, etc. This may be sent to a green liquor system (not shown) or to a dilute black liquor stream (not shown).

In a 500 tons/day kraft pulp mill, the concentrated black liquor may contain from about 50–70% by weight solids. The absorbent recycled in lines 18 and 16 by pump 19 typically would be from 1000–3000 gals./min. of the (dilute alkaline) activated carbon slurry. The spent slurry drawn off through first branch line 21 typically would be of the order of 100 gals./min. This rate, however, would be dependent on the rate of exhaustion of the absorbent, which, in turn, would depend chiefly on the sulphur content of the gases being purified.

Description of FIG. 2

Turning now to FIG. 2, a second branch line 25 is provided leading from first branch line 21 to a spent slurry regenerator 26. The regenerator 26 typically is cylindrical with a funnel-shaped bottom 27 provided with an internal sparger ring 28 supplied with air through air inlet line 29. Regenerated aqueous alkaline activated carbon slurry passes out of slurry outlet 30 via line 31 and then is pumped by pump 32 via line 33 to slurry outlet line 18 to be repumped by pump 19. Gases which are sparged off during the partial regeneration procedure in generator 26 pass out of gas outlet 34 via line 35 to a contaminated humid air inlet port 36.

In the example as given above, the spent slurry would be drawn off through second branch line 25 at a rate of about 100–500 gals./min. The regenerated slurry would be pumped through line 33 at the rate of about 100–500 gals./min. Here again, both these rates are dependent on the rate of exhaustion of the absorbent, as above discussed.

Description of FIG. 3

In FIG. 3, a third branch line 37 leads off second branch line 25 to a black liquor inlet line 38 which enters an activated carbon reactor 39 through inlet port 40. The reactor 39 may be any reactor conventionally used heretofore for the production of finely divided activated carbon from concentrated spent pulping liquors obtained in the pulping of cellulosic plant materials. Preferably, however, it is one of the embodiments of reactors disclosed in U.S. Pat. No. 3,595,806 dated July 27, 1971.

Thus, spent slurry is mixed with concentrated black liquor and is subjected to a controlled partial high temperature pyrolytic or oxidation treatment in the reactor 39. The hot gases, containing some suspended finely divided solids as well as other combustible components, and generally of low B.t.u. value, pass out through gas outlet 41, and may be conducted through gas line 42 either to the gas inlet port 36 of the kraft recovery furnace 10, or to a power boiler (not shown). The impure solid product, which is an intimate mixture of an adsorbent organic activated carbon residue and an inorganic product that exhibits alkaline reaction when dissolved in water, is withdrawn through solids outlet 43 via solids conveying line 44 to pass through water seal 45 which serves to prevent the escape of hot gases from reactor 39 through outlet 43 and also to convert the solid carbonaceous residue product into a slurry. Water seal 45 is fed from water inlet line 46. The fresh aqueous alkaline slurry of activated carbon so formed is conveyed through line 47 to an agitator and storage vessel 48, from whence it is pumped from outlet line 49 by pump 50 through line 51 to slurry outlet line 18 to be repumped via pump 19 and line 16 to gas scrubber 15.

In the embodiment as described above, the pump 50 pumps fresh aqueous alkaline activated carbon slurry through line 51 at a rate dependent on the make-up requirement of the absorption system and the prevailing conditions in the absorption system. One typical rate would be about 100 gals./min.

It has previously been taught that alkaline solutions containing, e.g. NaOH or $Na_2CO_3$ as active chemicals, are suitable for removing hydrogen sulphide. These solutions, however, have very little capacity for absorbing organic sulphur compounds, such as, for example, mercaptans (e.g. methyl mercaptan) and thio-ethers (e.g. dimethyl sulphide).

It has also previously been taught that activated carbon may be used for the absorption of $H_2S$, $CH_3SH$ and organic sulphur compounds. Furthermore, Mehta, D.S., and Calvert, S., in J. Environmental Sci. Tech., vol. 1 No. 4 (1967) have shown that powdered activated carbons in aqueous suspensions are capable of removing certain gas or vapour components from gas streams. They removed carbon dioxide, aliphatic hydrocarbons, benzene, toluene, and some other compounds, none of them containing sulphur, from a stream of nitrogen.

DESCRIPTION OF EXAMPLES OF THE INVENTION

General description

A series of tests were therefore carried out to compare the usefulness of (i) an aqueous solution of sodium carbonate, and (ii) an aqueous suspension of activated carbon, against the use of (iii) an aqueous alkaline slurry of activated carbon for removing hydrogen sulphide, methyl mercaptan and dimethyl sulphide from a gas stream containing these components as well as carbon dioxide and nitrogen, with the above sulphur compounds present in concentrations that might be typical for some kraft recovery furnace emissions under overload conditions. The experimental apparatus used was a conventional laboratory bubbler-absorber.

The test results indicated that a suspension of 0.5 percent by weight of powdered activated carbon in deionized water (pH=5.0) at 25° C. temperature had essentially the same capacity for absorbing the above-identified sulphur compounds, as the deionized water alone, which was tested separately under similar conditions. A dilute (1.7% by weight) solution of $Na_2CO_3$ containing no activated carbon was also used for the same purpose. It was found that the absorption of hydrogen sulphide increased significantly, that the absorption of methyl mercaptan increased moderately, and that the absorption of dimethyl sulphide was essentially the same, over and above what was absorbed previously by the deionized water.

Following this, an aqueous alkaline slurry or suspension of powdered activated carbon was prepared with $Na_2CO_3$ and activated carbon present together, each in the same concentration as they were separately in the above experiments, namely 1.7% by weight of $Na_2CO_3$ and 0.5% by weight of powdered activated carbon. The performance of this absorbing agent was not only excellent with respect to all three sulphur compounds (particularly $H_2S$ and $CH_3SH$) but, surprisingly, it was better than what could be predicted from the performance of the same two agents in a separate solution or suspension, at the same level of concentrations.

Specific descriptions

The following examples serve to illustrate the usefulness and the unexpected nature of the results of various aspects of the present invention:

EXAMPLES I–IV

In these examples, a series of adsorption experiments were carried out using 150 ml. of:

(I) Deionized water (pH=5.0).
(II) A sodium carbonate solution containing 1.7% by weight of sodium carbonate.
(III) A suspension of activated carbon (0.5% by weight) in deionized water.
(IV) A suspension of activated carbon (0.5% by weight) in a solution of sodium carbonate (1.7% by weight).

The activated carbon used in Examples III and IV was produced by high temperature partial oxidation treatment of a kraft black liquor. In Example No. III, the activated carbon was obtained by acid (5% by weight of $H_2SO_4$) leaching the primary solid product of the high temperature treatment. Such solid product contained 19% by weight of activated carbon and 81% by weight of acid leachable inorganic material. The inorganic material comprised 63.0% by weight of sodium carbonate, and 18% by weight of sodium sulphate on total solid basis. In Example No. IV, the above solid product was used without the removal of the inorganic components. The quantity (4.0 g./150 ml.) of the solid product of the high temperature treatment was such as to obtain a concentration of 0.5% by weight of activated carbon and 1.7% by weight of sodium carbonate, with the inert (from the point of view of absorption of sulphur compounds) sodium sulphate present in proportion corresponding to its original concentration in the solid product.

The gas supply was a prepared mixture, stored under pressure in a gas cylinder. Despite the periodic readjustments, the gas composition varied considerably between the experiments due to absorption and/or adsorption of the sulphur compounds on the mild steel cylinder wall.

The adsorption tests were carried out in a gas absorption bottle of a capacity of 300 ml. equipped with a sintered glass sparger. The volume of the liquid (or suspension) was always 150 ml. and the gas rates were maintained at a nominal 200 ml./min. The temperature in this series of experiments was 25±2° C. The inlet and outlet gas compositions were determined by analyses on a gas chromatograph.

Table I summarizes the results of these examples.

pound was not what could have been predicted by simply summing up the apparent absorptive capacities of the three agents (sodium carbonate in aqueous solution plus activated carbon in deionized water minus the values found with deionized water) but was, in fact, a multiple

TABLE I

| Example No. | Time of sampling, minutes | Concentration, percent weight of— | | Initial pH | Inlet gas composition | | | | |
|---|---|---|---|---|---|---|---|---|---|
| | | $Na_2CO_3$ | Carbon | | $H_2S$, p.p.m. by volume | $CH_3SH$, p.p.m. by volume | $(CH_3)_2S$, p.p.m. by volume | $CO_2$, percent by volume | $N_2$ |
| I | 0, 6, 14, 25 | 0 | 0 | 5.0 | 2,600 | 650 | 120 | 35 | Balance. |
| II | 0, 6, 14, 28, 120 | 1.7 | 0 | 11.0 | 1,600 | 650 | 100 | 29 | Do. |
| III | 0, 6, 14, 28, 60, 120 | 0 | 0.5 | 5.0 | 1,500 | 280 | 60 | 23 | Do. |
| IV | 0, 6, 14, 28, 60, 120 | 1.7 | 0.5 | 11.0 | 2,500 | 680 | 120 | 29 | Do. |

| Example No. | Final pH | Efficiency of removal,[1] percent | | | Capacity parameter,[2] for— | | |
|---|---|---|---|---|---|---|---|
| | | $H_2S$ | $CH_3SH$ | $(CH_3)_2S$ | $H_2S$ | $CH_3SH$ | $(CH_3)_2S$ |
| I | 4.0 | 50, 23, 8 | 54, 46, 8 | 79, 42, 17 | 3 | 3 | 4 |
| II | 8.0 | 100, 97, 12, 12 | 92, 8, 0, 0 | 70, 20, 0, 0 | 18 | 7 | 3 |
| III | 3.0 | 63, 42, 25, 25, 6.2 | 95, 92, 79, 47, 11 | 90, 80, 63, 27, 0 | 3 | 7 | 3 |
| IV | 8.0 | 100, 100, 86, 52, 4 | 100, 99, 94, 73, 41 | 95, 83, 58, 26, 0 | 42 | 38 | 11 |

NOTE.—See text for footnote ([1,2]) references.

The efficiency of removal (superscript 1) is expressed as percent reduction of the volumetric concentration of the component, relative its volumetric concentration in the inlet gas.

The estimated approximate capacity parameter (superscript 2) is expressed as time (min.) required for the efficiency of removal to drop to 90%, with an arbitrary correction for a uniform concentration of $H_2S$, $CH_3SH$ and $(CH_3)_2S$ of 1500, 650 and 150 p.p.m. respectively.

Examination of the date in Table I shows that:

(a) Sodium carbonate, at room temperature, is a good absorbent of hydrogen sulphide, a poor absorbent for methyl mercaptan and has no specific capacity (beyond that of the apparent physical solubility) for absorbing dimethyl sulphide.

(b) A slurry of activated carbon in deionized water (pH=5.0) had little or no specific capacity (again beyond that of apparent physical solubilities) to absorb any of the sulphur compounds.

(c) Activated carbon of the same concentration, source and quality, but prepared without the prior removal of the sodium carbonate (and sodium sulphate) showed a sharply increased capacity to absorb all the odoriferous sulphur compounds present, and the adjusted (for equal loads) capacity found with regard to each sulphur compound was not what could have been predicted by simply summing up the apparent absorptive capacities of the three agents (sodium carbonate in aqueous solution plus activated carbon in deionized water minus the values found with deionized water) but was, in fact, a multiple of such sum. This surprising synergistic effect by itself, as well as the extent of the improvement represents one important feature of the present invention.

EXAMPLES V–X

These examples are given to illustrate further the applicability of this invention under different conditions (at a higher temperature) or with the use of a suspension of a commercial powdered carbon suspended in a pure sodium carbonate solution.

In this series of examples, the experimental apparatus, the gas rates, and the slurry volumes were the same as in the tests of Examples I–IV, but the gas mixture was supplied from three different gas cylinders, each containing $N_2$ and one or two sulphur compounds, in this case including dimethyl disulphide as one of the organic sulphur compounds. One of the cylinders contained carbon dioxide as well. The final gas mixtures were obtained by metering the primary gas mixtures in certain proportions. In Example X, a commercially available, water treatment grade, powdered carbon was used along with an alkaline agent (namely, $Na_2CO_3$) as one of the absorbing agents.

Table II below summarizes the results of these experiments.

In the table, the abbreviation N.D. means "Not Determined".

The efficiency of removal (superscript 1) is expressed as percent reduction of the volumetric concentration of the component, relative to its volumetric concentration in the untreated gas.

The estimated, approximate capacity parameter (superscript 5) is expressed as time (min.) required for the efficiency of removal to drop to 90%, with an arbitrary correction for a uniform concentration of $H_2S$, $CH_3SH$, $(CH_3)_2S$ and $(CH_3)_2S_2$ of 4000, 1800, 1000 and 1000 respectively.

Subscript 6 indicates that a commercial carbon and $Na_2CO_3$ were used in the experiment. In other tests in this table, the active agents were produced as mixtures directly from spent pulping liquor.

sulphide and methyl mercaptan and less capacity for absorbing dimethyl sulphide and dimethyl disulphide than an alkaline slurry prepared from a commercial water purification grade carbon (Aqua Nuchar A) and pure sodium carbonate with the concentration of the active ingredients being identical in both tests (Example IX vs. Example X).

EXAMPLES XI–XVII

A further series of tests were carried out using slurries of Aqua Nuchar A, the trademark for a commercial grade of powdered carbon produced from spent pulp liquor, and sodium carbonate. The results are summarized in Table III. The description of the absorption/adsorption system is given below. The apparatus was similar to that de-

TABLE II

| Example No. | Concentration, percent weight of— | | Temperature, °C | Initial pH | Inlet gas composition | | | | | |
|---|---|---|---|---|---|---|---|---|---|---|
| | $Na_2CO_3$ | Carbon | | | $H_2S$, p.p.m. by volume | $CH_3SH$, p.p.m. by volume | $(CH_3)_2S$, p.p.m. by volume | $(CH_3)_2S_2$, p.p.m. by volume | $CO_2$, percent by volume | $N_2$, percent by volume |
| V | 1.7 | 0 | 70 | 11.0 | 3,600 | 2,250 | 1,210 | 1,990 | 24 | Balance. |
| VI | 1.7 | 0.5 | 70 | 11.0 | 3,050 | 2,580 | 1,120 | 1,930 | 23 | Do. |
| VII | 1.7 | 0.5 | 25 | N.D. | 6,400 | 1,820 | 900 | 1,870 | 22 | Do. |
| VIII | 1.7 | 0.5 | 70 | N.D. | 5,800 | 2,140 | 990 | 1,980 | 21 | Do. |
| IX | 3.4 | 1.0 | 25 | 11.0 | 5,600 | 1,530 | 660 | 620 | 21 | Do. |
| X | 3.4 | [6]1.0 | 25 | N.D. | 6,200 | 1,510 | 710 | 410 | 12 | Do. |

| Example No. | Time of sampling minutes | Final pH | Efficiency of removal [1] | | | | Capacity parameter [5] for— | | | |
|---|---|---|---|---|---|---|---|---|---|---|
| | | | $H_2S$ | $CH_3SH$ | $(CH_3)_2S$ | $(CH_3)_2S_2$ | $H_2S$ | $CH_3SH$ | $(CH_3)_2S$ | $(CH_3)_2S_2$ |
| V | 0 / 6 / 14 / 28 / 60 | 8.5 | — / 99 / 91 / 62 / 46 | — / 13 / 0 / 0 / 0 | — / 12 / 8 / 2 / 2 | — / 47 / 30 / 24 / 26 | 13 | 1 | 1 | 2 |
| VI | 0 / 6 / 14 / 28 / 60 | 8.7 | — / 99 / 99 / 94 / 69 | — / 99 / 91 / 34 / 1 | — / 95 / 0 / 0 / 0 | — / 97 / 25 / 9 / 25 | 27 | 22 | 9 | 14 |
| VII | 0 / 6 / 14 / 28 / 60 | 8.2 | — / 100 / 99 / 61 / 9 | — / 100 / 99 / 34 / 0 | — / 95 / 88 / 3 / 2 | — / 99 / 94 / 71 / 35 | 29 | 17 | 11 | 22 |
| VIII | 0 / 6 / 14 / 28 / 60 | 8.7 | — / 100 / 82 / 36 | — / 100 / 0 / 0 | — / 98 / 2 / 2 | — / 97 / 23 / 36 | 33 | 10 | 8 | 18 |
| XI | 0 / 6 / 14 / 28 / 60 | 8.3 | — / 99 / 99 / 99 / 69 | — / 70 / 99 / 89 / 0 | — / 64 / 61 / 7 / 0 | — / 77 / 85 / 63 / 16 | 57 | 23 | 2 | 3 |
| X | 0 / 6 / 14 / 28 / 60 | 8.4 | — / 100 / 100 / 92 / 56 | — / 100 / 99 / 63 / 0 | — / 94 / 83 / 0 / 0 | — / 99 / 95 / 74 / 60 | 51 | 15 | 6 | 7 |

NOTE.—See text for footnotes ([1,5]) references.

Examination of data presented in Table II shows that:

(a) The difference between the absorptive capacities of a dilute sodium carbonate solution (Example V) and a solution containing the same amount of sodium carbonate and a small amount of powdered activated carbon (Example VI) is even more pronounced with respect to the organic sulphur compounds at the higher temperatures (70° C. illustrated here) than at 25° C. The improvement with respect to hydrogen sulphide is somewhat less at the higher temperature, but it is still very substantial.

(b) The increase in the temperature in a given alkaline slurry of activated carbon (Example VII vs. Example VIII) caused an increase in the absorption of hydrogen sulphide, and a decrease in the absorption of the organic sulphur compounds.

(c) The alkaline slurry of activated carbon derived directly from spent pulping liquor by high temperature treatment showed higher capacity for absorbing hydrogen scribed hereinabove, but the gas rates were higher, of the order of about 325 ml./min.

Examples Nos. XI–XVIII: Aqua Nuchar A+$Na_2CO_3$ slurries

XI _____ 1.0% Carbon in 3.4% $Na_2CO_3$.
XII _____ 1.0% Carbon in 3.4% $Na_2CO_3$.
XIII _____ 1.0% Carbon in 3.4% $Na_2CO_3$.
XIV _____ 1.0% Carbon in 3.4% $Na_2CO_3$.

Examples Nos. XI–XVII: Aqua Nuchar A+$Na_2CO_3$ slurries

XV _____ 3.4% $Na_2CO_3$.
XVI _____ 1.0% Carbon in 3.4% $Na_2CO_3$.
XVII _____ 3.4% $Na_2CO_3$.

TABLE III.—RESULTS OF ABSORPTION STUDIES GIVEN AS TIME IN MINUTES FOR THE ABSORPTION EFFICIENCY TO DROP TO 90%

| Example No. | Total weight of carbon, grams | Total weight of $Na_2CO_3$, grams | Temperature, °C. | Inlet gas composition, percent | | | | | Estimated time for removal efficiency to drop to 90% minutes | | |
|---|---|---|---|---|---|---|---|---|---|---|---|
| | | | | $CO_2$ | $O_2$ | $H_2S$ | $SO_2$ | $CH_3SH$ | $H_2S$ | $SO_2$ | $CH_3SH$ |
| XI | 1.5 | 5.1 | 75 | 14.8 | ------- | .39 | .08 | .12 | 26 | >45 | 14 |
| XII | 1.5 | 5.1 | 75 | 14.0 | ------- | .33 | .41 | .10 | 38 | >60 | 22 |
| XIII | 1.5 | 5.1 | 75 | 15.5 | 2.4 | .38 | .08 | .12 | 60 | >90 | 47 |
| XIV | 1.5 | 5.1 | 75 | 15.1 | 5.3 | .36 | .08 | .11 | >90 | >90 | >90 |
| XV | | 5.1 | 75 | 15.2 | 5.7 | .36 | .08 | .11 | 17 | >90 | 2 |
| XVI | 1.5 | 5.1 | 75 | 14.6 | 3.4 | .10 | .22 | .11 | >300 | >300 | >300 |
| XVII | | 5.1 | 75 | 14.7 | 3.2 | .11 | .20 | .10 | *40 | >300 | <<10 |

*Improvement due solely to lower $H_2S$ in feed gas.

A study of the data in Table III reveals the following:

(1) When an increasing amount of $SO_2$ (which gas is always present in kraft furnace gases) was added to the feed gas mixture, the efficiency and the capacity of the slurries to remove $H_2S$, and, surprisingly, $CH_3SH$ improved significantly. (Example XI vs. Example XII).

(2) When $O_2$ was introduced into the feed gas mixtures in concentrations typical of kraft furnace gases (2 to 3.5%), the removal of both $H_2S$ and $CH_3SH$ improved even more (Example XI vs. Example XIII and Example XIV). Further, what might be called dramatic improvement in the removal of the $H_2S$ and $CH_3SH$ results when the ratios of $H_2S$ and $SO_2$ are reversed from about 5:1 to 1:2, again more typical of the actual furnace gases. Briefly, a very significant overall improvement resulted when the closest simulation of the conditions (except for various organic trace components in the gas) prevailing in a recovery furnace stack gas was applied. It might be added that no specific improvement was achieved when using $Na_2CO_3$ as the absorbent and making similar changes in the gas composition.

There appears to be some unexpected catalytic action by the activated carbon in the presence of $SO_2$ (catalyzing the $2H_2S+SO_2=3S+2H_2O$ and some unknown reaction(s) probably consuming $CH_3SH$) and in the presence of $O_2$ and $SO_2$ (probably promoting the oxidation of $Na_2S$ and $CH_3SH$ as well as other favourable reactions) is responsible.

The above assumption regarding some catalytic action appears to be confirmed by some additional experiments described below in a summary fashion.

EXAMPLES XVIII–XXXII

In these experiments, the quantity of the sodium carbonate used was the same 5.1 g. as before but it was dissolved in 250 ml. water (instead of 150 ml. used earlier) corresponding to 2.0% by weight of $Na_2CO_3$. The activated carbon concentrations were reduced first to 0.1% wt., then to 0.06, 0.03, 0.02 and 0.01% by weight of the total slurry. The same laboratory gas bubbler (300 ml. capacity) was used as before, and the gas rates were maintained at about 325 ml./min. The compositions of the untreated gases were in the following ranges:

$H_2S$: 1000–1500 p.p.m. by volume
$SO_2$: 1500–2500 p.p.m. by volume
$CH_3SH$: 400–1100 p.p.m. by volume
$(CH_3)_2S$: 0–250 p.p.m. by volume
$(CH_3)_2S_2$: 0–250 p.p.m. by volume
$O_2$: 2.0–4.0% by volume
$CO_2$: 14–16% by volume
$N_2$: Balance At any of the above given activated carbon concentrations, a number of tests were made with various grades of powdered carbons namely with (Aqua Nuchar A, and with various carbons produced according to the process described in U.S. Pat. No. 3,595,806 referred to above).

The gas compositions were also varied, mostly with respect to the concentration of the organic sulphur compounds. The results of this series of experiments, all carried out at 75° C., can be summarized as follows:

(a) When the carbon concentrations were reduced to the levels of 0.01 to 0.1% by weight, the alkaline slurries have lost their capacity to absorb any appreciable amounts of dimethyl sulphide or dimethyl disulphide (the removal efficiencies dropped to less than 90% in less than 10 minutes in all cases).

(b) The capacity of the above slurries to remove $H_2S$, $SO_2$ and $CH_3SH$ remained excellent down to 0.03% by weight of activated carbon concentrations. In one experiment, at an activated carbon concentration of 0.03%, the efficiency of removal of $H_2S$, $SO_2$ and $CH_3SH$ stayed at values higher than 90% for 1440 min. (i.e. 24 hours), with no sign of a definite drop in the removal efficiency at the end of the test. However, at the 0.01% by weight carbon level, the capacity of the slurry to adsorb any sulphur compound except $SO_2$ was greatly reduced, and it could not be used very efficiently unless it was regenerated after a very short exposure. It appeared, furthermore, that carbons of very good quality could be used at about 0.02% by weight concentration in alkaline slurries, with some loss of removal efficiency for $H_2S$ and particularly $CH_3SH$.

EXAMPLE XXXIII–XXXV

In these experiments, the effectiveness of a bark char fly-ash material (a moderately active charcoal) obtained as part of the fly-ash collected in a multi-cyclone device in the flue gas outlet from a bark burning power boiler, was tested for odour abatement. The test was designed to give a comparative evaluation of the capacity of the following agents for removing reduced sulphur compounds:

(i) A pure sodium carbonate solution (2% by wt. of water used) (Example XXXIII).
(ii) Bark char fly-ash (pulverized, but otherwise untreated) suspended in a solution identical to (i), at a concentration of 0.1% by weight of water used (Example XXXIV).
(iii) An alkaline slurry of activated carbon, identical to (ii), except for using 0.1% by weight of a commercial carbon (Aqua Nuchar-A) in place of the same concentration of bark char (Example XXXV).

The experiments were carried out in the bubbler-absorber apparatus described in the earlier examples. The volume of the solution and/or slurry was 200 ml. and the gas rate was maintained at 300± 20 ml./min. The absorber was under thermostatic control at 75±2° C. The initial pH of scrubbing solution and slurries was 11.25± 0.05.

The compositions of the untreated gases were as follows:

| Gas component | Percent volume of— | | | P.p.m. volume of— | | |
|---|---|---|---|---|---|---|
| | $CO_2$ | $O_2$ | $H_2S$ | $CH_3SH$ | $(CH_3)_2S_2$ | $N_2$ |
| Example: | | | | | | |
| XXXIII | 17.4 | 3.4 | 1,800 | 240 | Nil | Balance. |
| XXXIV | 17.9 | 3.7 | 2,100 | 340 | 4 | Do. |
| XXXV | 18.0 | 3.8 | 2,120 | 330 | 22 | Do. |

The concentrations of various sulphur compounds and corresponding removal efficiencies in the outlet gases 38±3 minutes and 172±2 minutes after the start of absorption were as follows]

| | H₂S | | CH₃SH | | (CH₃)₂S₂ | |
|---|---|---|---|---|---|---|
| Gas component | P.p.m., volume | Percent removed | P.p.m., volume | Percent removed | P.p.m., volume | Percent removed |
| a., after 38 minutes, Example: | | | | | | |
| XXXIII | 850 | 52.7 | 185 | 22.9 | 6 | |
| XXXIV | 24 | 98.9 | 18 | 94.7 | 18 | |
| XXXV | 5 | 99.8 | 6 | 98.2 | 11 | 50.0 |
| b., after 172, minutes, Example: | | | | | | |
| XXXIII | (¹) | (¹) | (¹) | (¹) | (¹) | (¹) |
| XXXIV | 56 | 97.3 | 42 | 87.6 | 48 | |
| XXXV | 4 | 99.8 | 3 | 99.1 | 19 | 13.6 |

¹ Not available, test terminated after 38 minutes on account of poor treatment efficiencies.

As can be seen from the above-described experiments with the alkaline slurry of activated carbon, variations in the gas composition, temperature, concentrations of activated carbon and sodium carbonate, and finally, in the source and quality of the activated carbons applied have resulted, in most cases, in separations which were most favourable from the point of view of removal of the objectionably odoriferous sulphur components.

The present invention in its various aspects has numerous advantages over the present practice of scrubbing sulphur-containing objectionably odoriferous gases with alkaline solutions not containing activated carbon. Among the advantages are:

(1) Absorption of organic sulphur compounds, such as, for example, mercaptans, which absorb poorly in simple alkaline solutions alone can be activated with very high efficiency.

(2) The capacity to absorb hydrogen sulphide for a solution of a given volume and alkalinity is greatly increased. Thus, lesser amounts of alkaline agents will be needed for removing a given amount of hydrogen sulphide.

(3) When the invention is applied in a pulp mill, the absorption of the hydrogen sulphide and organic sulphur compounds can be achieved using agents derived at very low cost from the plentiful supply of spent pulping liquor available in the pulp mill. No chemicals or activated carbon have to be purchased.

(4) When the alkaline slurry of activated carbon is made from spent liquor on the site of application, the constant or occasional overload on the existing recovery furnace can be eased or completely eliminated. This, by itself, can contribute to the reduction of the air pollution originating from the pulp mill.

The term "smelt product of a Kraft recovery furnace" as used herein refers to the product well-known to those skilled in the art, which is of the following composition:

70–80% sodium carbonate
20–30% sodium sulfide
up to 10% contaminants, e.g. sodium sulfate, sodium chloride, chloride and trace compounds of the alkaline earth metals.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A process for the absorption, oxidation and removal of odoriferous sulphur-containing compounds from a gas stream containing a member selected from the group consisting of H₂S, methyl mercaptan, and mixtures thereof, which process comprises intimately contacting the gas stream with an aqueous alkaline suspension of activated carbon having a pH of at least about 8, in the presence of at least about 12% by volume of CO₂ and not more than about 6% by volume of oxygen based on said gaseous stream on a dry basis, said activated carbon promoting the oxidation of S⁼ and CH₃SH.

2. The process of claim 1 wherein said contacting includes the step of passing the gas stream upwardly in a gas scrubbing zone through said moving aqueous alkaline suspension of activated carbon.

3. The process of claim 2 wherein said suspension is continuously removed from said gas scrubbing zone, and at least a portion thereof is continuously recycled back to said gas scrubbing zone.

4. The process of claim 3 wherein a minor stream of removed said suspension is withdrawn from the recycle stream, and is filtered to remove solids from liquids, and wherein fresh make-up said aqueous suspension of activated carbon is added to the recycle stream.

5. The process of claim 19 carried out in a turbulent contact absorber zone or a cascade-type scrubber zone.

6. The process of claim 3 wherein said presence of oxygen is provided by the steps of: withdrawing a minor stream of removed said suspension from said recycle stream; passing said withdrawn suspension into a sparging zone where said oxygen gas is passed therethrough; and returning said suspension of activated carbon to said recycle stream.

7. The process of claim 6 wherein objectionably odoriferous sulphur compounds released in said sparging zone are fed to a kraft recovery furnace.

8. The process of claim 3 including the steps of: withdrawing a minor stream of removed said suspension from said recycle stream; passing said withdrawing suspension to an activated carbon production zone along with spent pulping liquors containing dissolved organic matter of lignocellulosic origin as one group of components and one or more non-volatile basic pulping agents as another group of components; subjecting said materials to a process of controlled partial high temperature pyrolytic or oxidation treatment, thereby to provide a solid product which is an intimate mixture of an adsorbent organic activated carbon residue and an inorganic product that exhibits alkaline reaction when dissolved in water; and returning the fresh suspension of aqueous alkaline activated carbon so prepared to said recycle stream.

9. The process of claim 8 wherein gases resulting from said controlled partial high temperature pyrolytic or oxidation treatment are fed to a kraft recovery furnace.

10. The process of claim 4 including the steps of combusting the separated solids in a recovery furnace, and introducing the liquid into a spent liquor recovery cycle.

11. The process of claim 2 including the step of treating spent pulping liquors containing dissolved organic matter of lignocellulosic origin in a kraft recovery furnace zone with air and passing the odoriferous gases released in said recovery zone to said gas scrubbing zone.

12. The process of claim 1 wherein said aqueous alkaline slurry or suspension of activated carbon comprises powdered or relatively fine granular carbon and a suitable alkaline agent.

13. The process of claim 3 wherein the alkaline agent is sodium carbonate, potassium carbonate, sodium hydroxide, potassium hydroxide or mixtures thereof.

14. The process of claim 1 wherein said aqueous alkaline suspension of activated carbon is prepared from spent pulping liquors containing dissolved organic matter of lignocellulosic origin as one group of components and one or more non-volatile basic pulping agents as another group of components, by a process of controlled partial high temperature pyrolytic or oxidation treatment, thereby to provide a solid product which is an intimate mixture of an adsorbent organic activated carbon residue and an inorganic product that exhibits alkaline reaction when dissolved in water.

15. The process of claim 14 wherein said solid product produced thereby is dissolved in water and is used in the aqueous suspension without separation, drying or other further treatment.

16. The process of claim 1 wherein said gas stream is the effluent from a recovery furnace in a pulp mill, said stream containing suspended particulate matter, selected from the group consisting of $Na_2CO_3$, $MgO$, and $CaO$ and mixtures thereof, and char of appreciable surface area, and including the steps of scrubbing said gas stream by intimately contacting said gas stream with an aqueous alkaline suspension of activated carbon, thereby to remove and recover a significant fraction of said suspended particulate matter and also to supply at least a portion of the alkalinity and/or the activated carbon to said aqueous alkaline suspension by said recovered suspended particulate matter.

17. The process of claim 16 wherein said aqueous alkaline suspension of activated carbon is formed in part by powdered or relatively fine granular carbon derived from the effluent from the smelt product of a recovery furnace in a pulp mill.

18. The process of claim 1 wherein said activated carbon comprises a bark char fly-ash material collected in a solid-gas separator device in the flue gas outlet from a bark-burning power plant.

19. The process of claim 2 carried out counter-currently.

20. The process of claim 2 carried out co-currently.

21. The process of claim 20 carried out in a Venturi scrubber zone.

22. The process of claim 3 wherein the alkaline agent is calcium hydroxide or magnesium hydroxide or mixtures thereof.

23. A process for the removal of odoriferous sulphur-containing compounds selected from the group consisting of $H_2S$, methyl mercaptan and mixtures thereof from the gaseous effluent from a kraft recovery furnace of a kraft pulp mill, which process comprises:
(1) feeding said gaseous effluent from said kraft recovery furnace to the bottom of a gas scrubbing zone where it is passed in intimate counter-current contact with a downwardly moving aqueous alkaline suspension of activated carbon having a pH of at least about 8, in the presence of at least about 12% by volume of $CO_2$ and not more than about 6% by volume of oxygen based on said gaseous stream on a dry basis;
(2) withdrawing aqueous alkaline suspension from the bottom of said gas scrubbing zone;
(3) leading the withdrawn suspension to an agitated holding zone;
(4) drawing off a minor portion of the withdrawn suspension stream from said agitated holding zone, filtering out solid particles of spent carbon, and recovering the aqueous alkaline solution; and
(5) recycling a major portion of the suspension stream from the agitated holding zone back to said gas scrubbing zone for further contact with said gas.

24. The process of claim 23 including the additional steps of:
(A) drawing away a portion of the minor portion of the suspension stream prior to being processed by step (4);
(B) passing said drawn away portion downwardly through an air contacting zone in contact with upwardly moving, admitted air;
(C) recovering aqueous alkaline suspension from said air contacting zone and returning it to the recycle stream in step (5); and
(D) passing the contaminated humid air from the air contacting zone to said gas scrubbing zone.

25. The process of claim 23 wherein the contaminated humid air is fed to the kraft recovery furnace for later passage to said gas scrubbing zone.

26. A process as claimed in claim 23 including the steps of:
(i) drawing away a portion of the minor portion of the suspension stream prior to being processed by step (4);
(ii) passing such drawn away suspension to an activated carbon reaction zone where it is mixed with concentrated black liquor derived from the sodium-base pulping of wood and is subjected to a controlled partial high temperature pyrolytic or oxidation product which is an intimate mixture of an adsorbent organic activated carbon residue and an inorganic product that exhibits alkaline reaction when dissolved in water, and hot gaseous products of combustion;
(iii) passing said hot gaseous products of combustion to a gas inlet port of said kraft recovery furnace;
(iv) withdrawing said solid product from said activated carbon reaction zone;
(v) passing said solid product through water, thereby to provide an aqueous alkaline suspension of activated carbon; and
(vi) passing said aqueous alkaline suspension of activated carbon so formed to the recycle stream in step (5).

References Cited

UNITED STATES PATENTS

| | | | |
|---|---|---|---|
| 2,886,131 | 5/1959 | Conlisk et al. | 23—4 X |
| 3,403,319 | 7/1946 | Williams | 23—181 X |
| 3,442,603 | 5/1969 | Lazaros | 23—2 R |
| 3,250,591 | 5/1966 | Bergholm et al. | 23—2 R |
| 2,632,738 | 3/1953 | Hassler et al. | 252—421 |
| 3,574,556 | 4/1971 | Buxton | 23—2 R |
| 3,152,985 | 10/1964 | Stoertz et al. | 252—421 X |

FOREIGN PATENTS

| | | | |
|---|---|---|---|
| 396,969 | 8/1933 | Great Britain | 23—2 R |

EARL C. THOMAS, Primary Examiner

U.S. Cl. X.R.

162—51; 252—421

UNITED STATES PATENT OFFICE
CERTIFICATE OF CORRECTION

Patent No. 3,701,824      Dated October 31, 1972

Inventor(s) STEVEN PRAHACS AND SATYA PAL BHATIA

It is certified that error appears in the above-identified patent and that said Letters Patent are hereby corrected as shown below:

Column 1, line 6, "Bhatta" should be -- Bhatia --.

Signed and sealed this 1st day of May 1973.

(SEAL)
Attest:

EDWARD M. FLETCHER, JR.           ROBERT GOTTSCHALK
Attesting Officer                 Commissioner of Patents